W. R. MACKLIND.
DRYING MECHANISM.
APPLICATION FILED AUG. 10, 1912.
1,191,921.
Patented July 18, 1916.
12 SHEETS—SHEET 1.
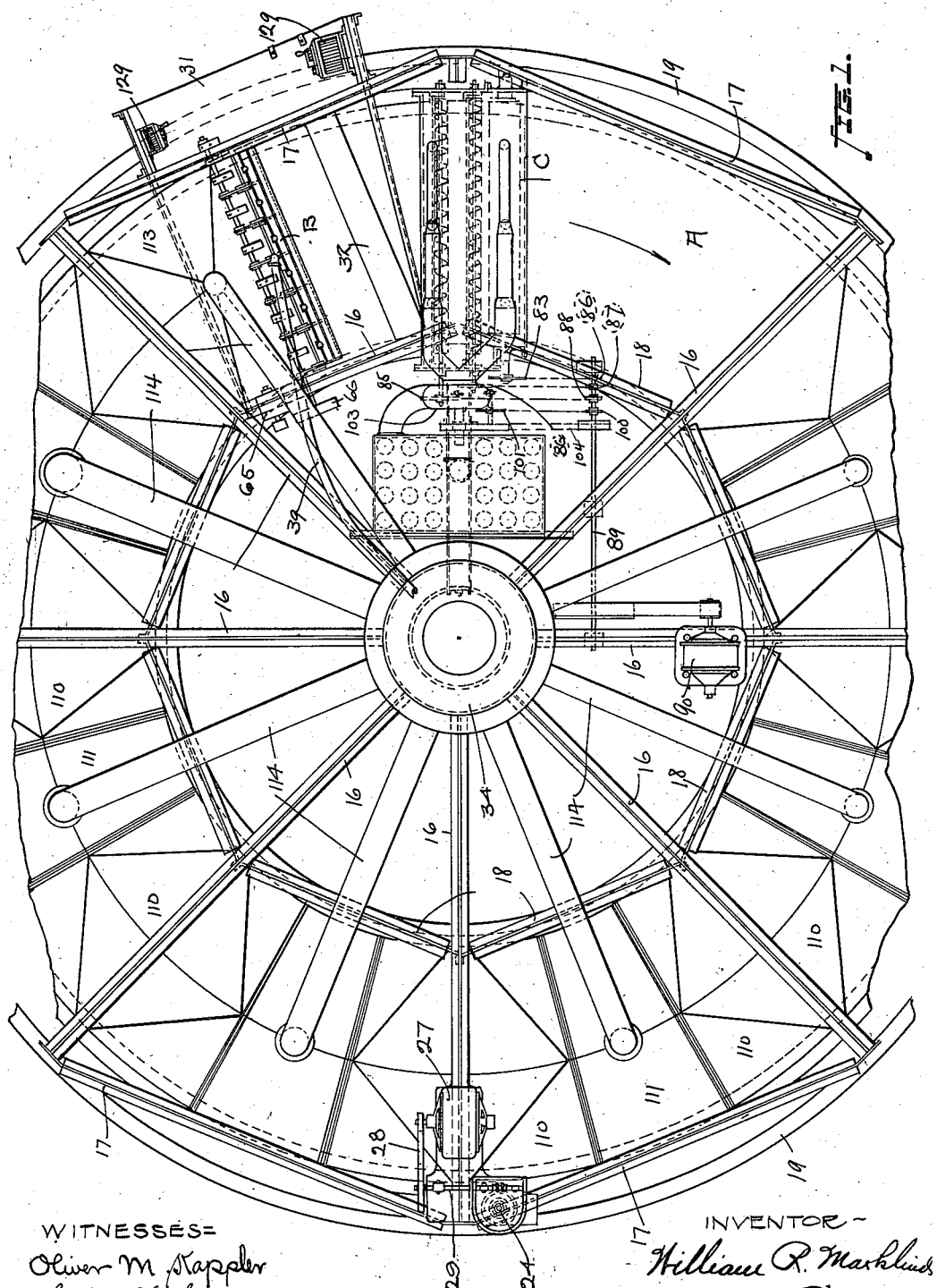
WITNESSES:
Oliver M Kappler
H. M. Kathe
INVENTOR—
William R. Macklind
BY
J. B. Fay
ATTORNEY—

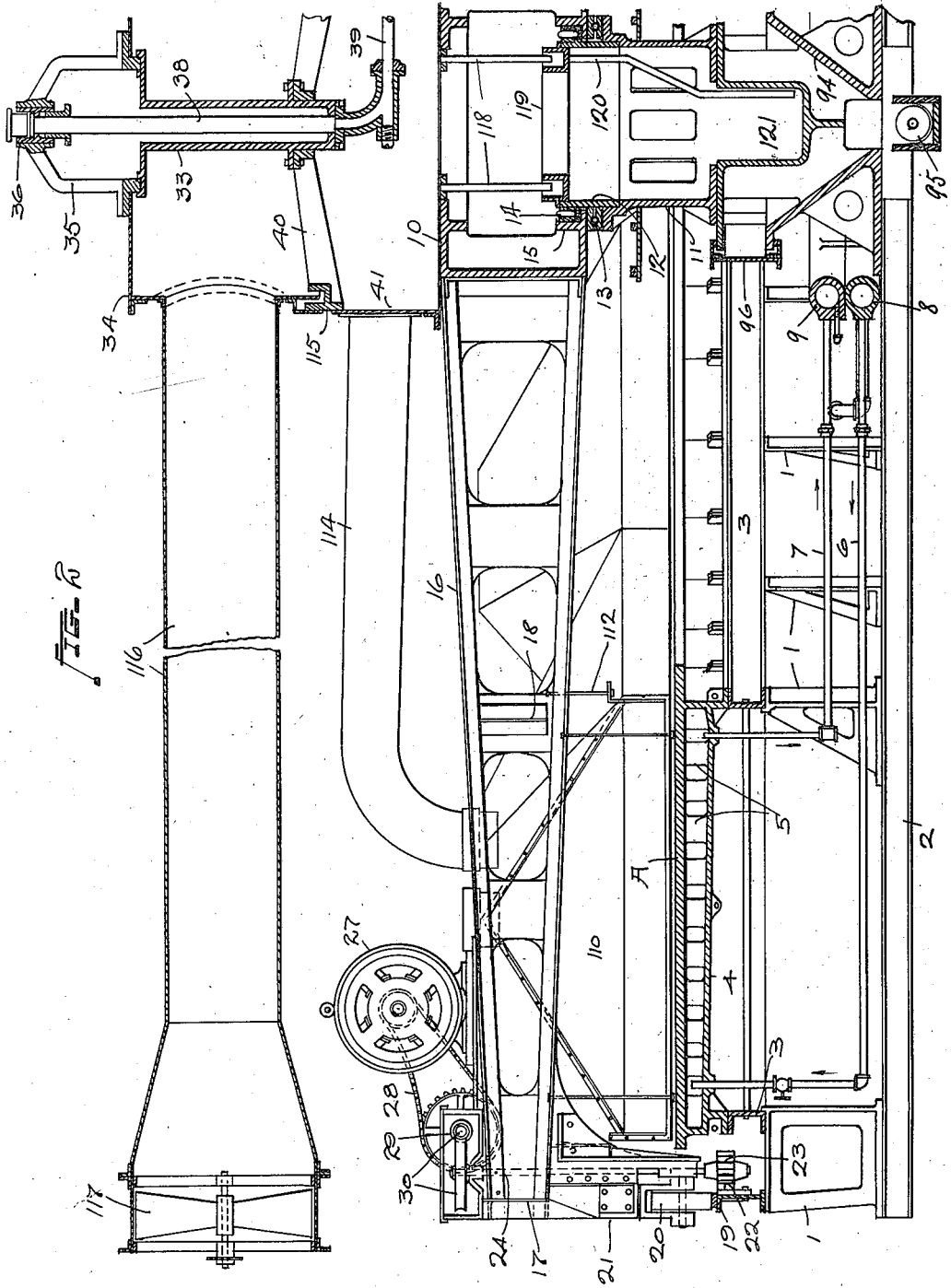

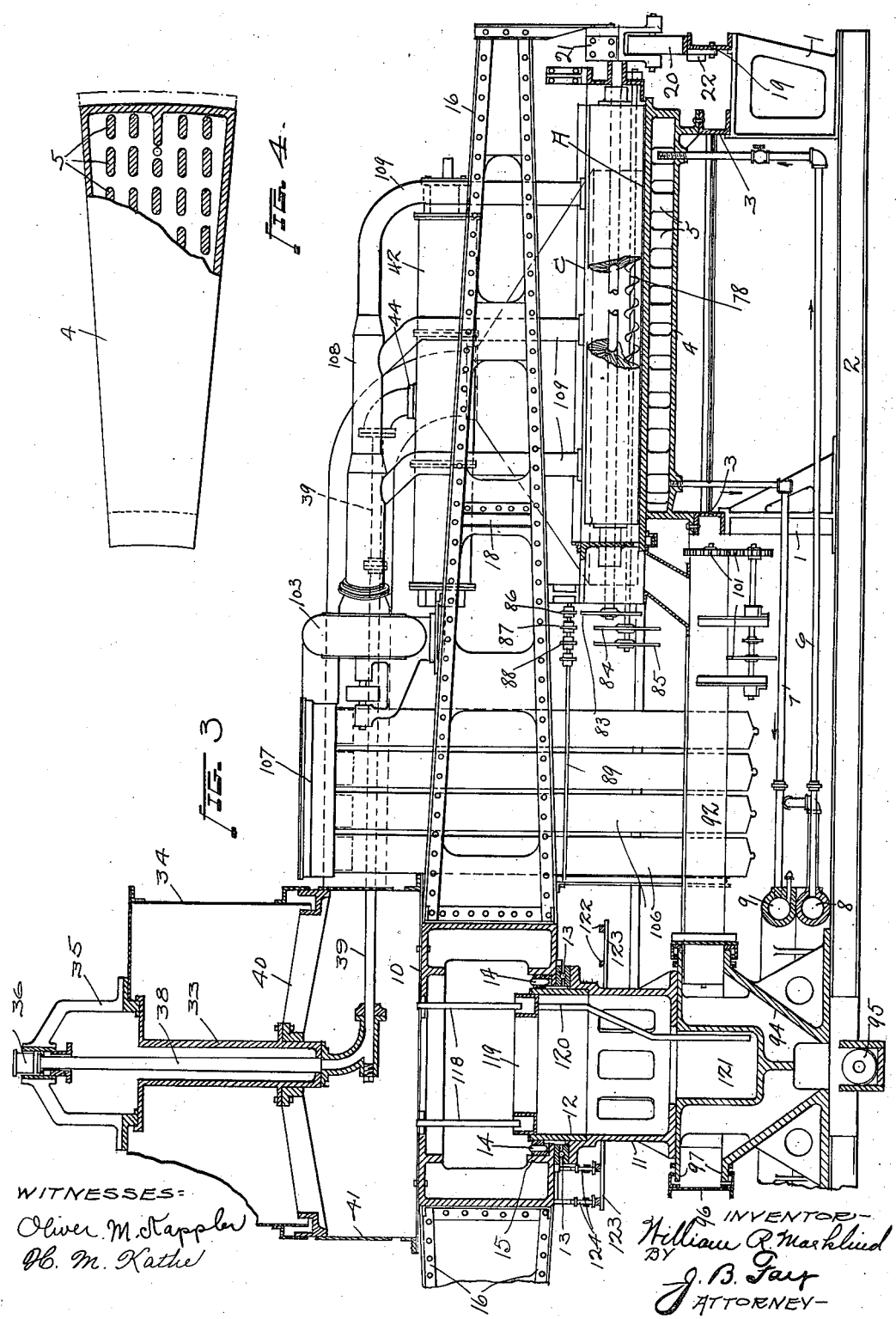

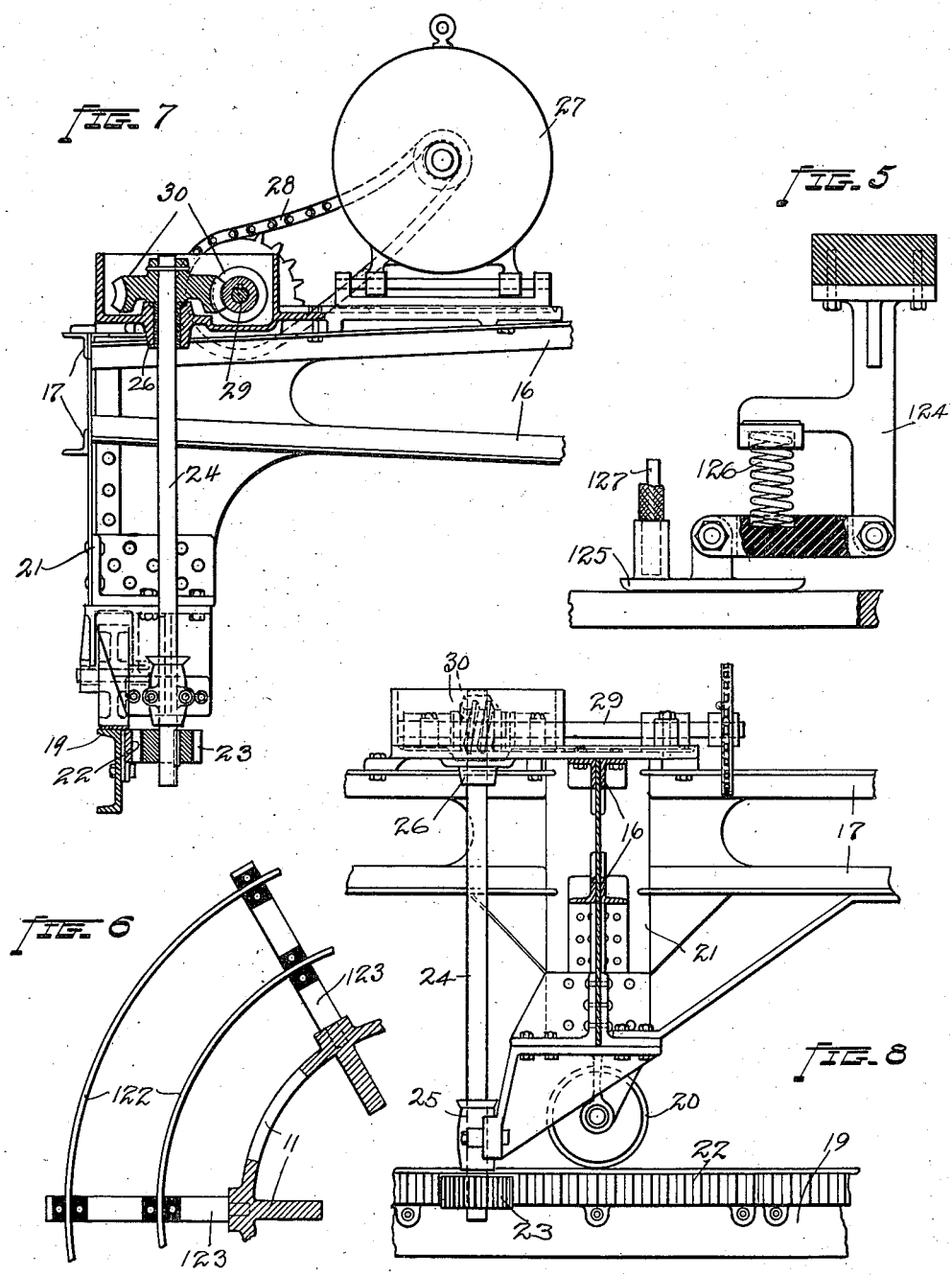

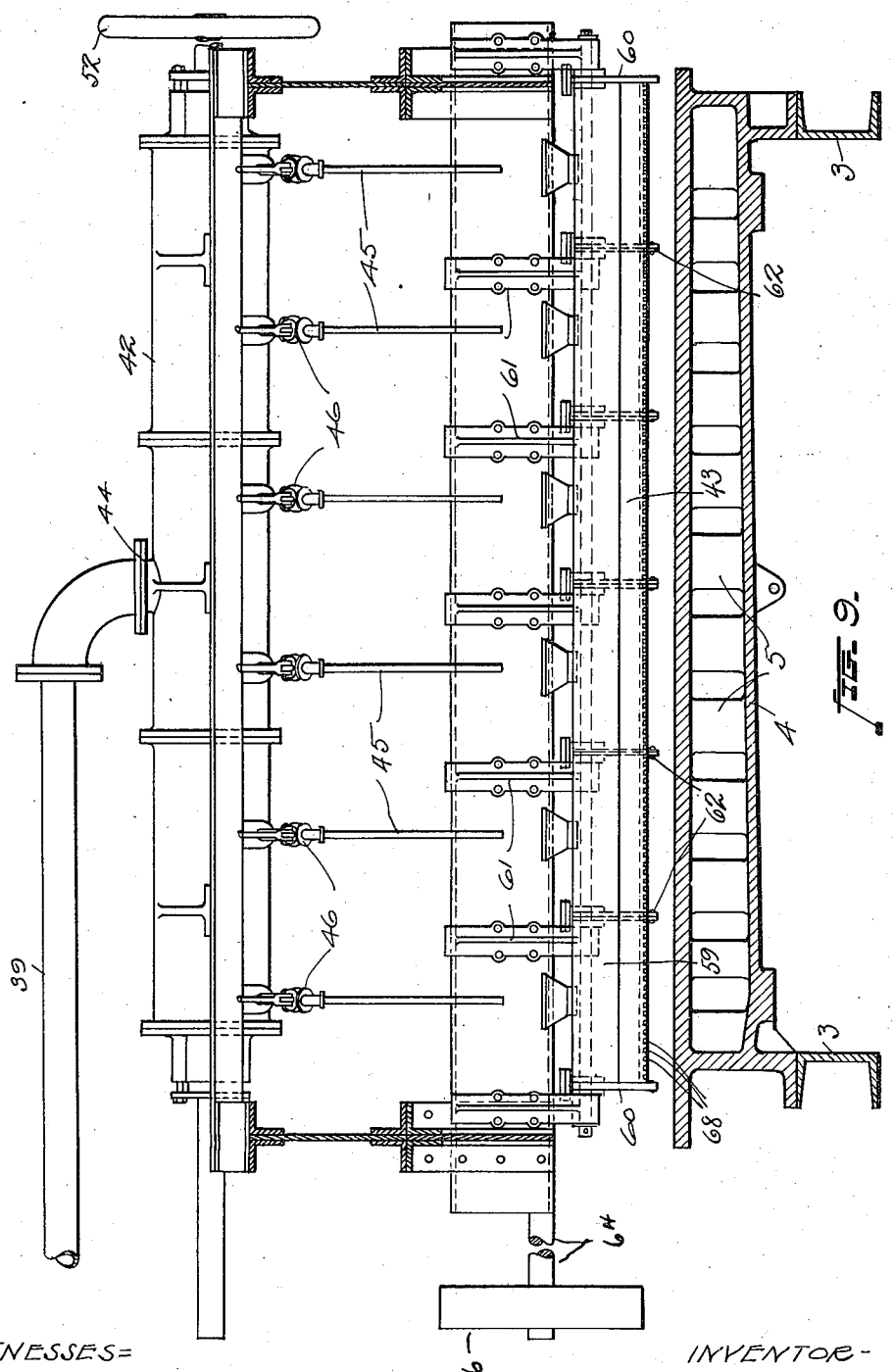

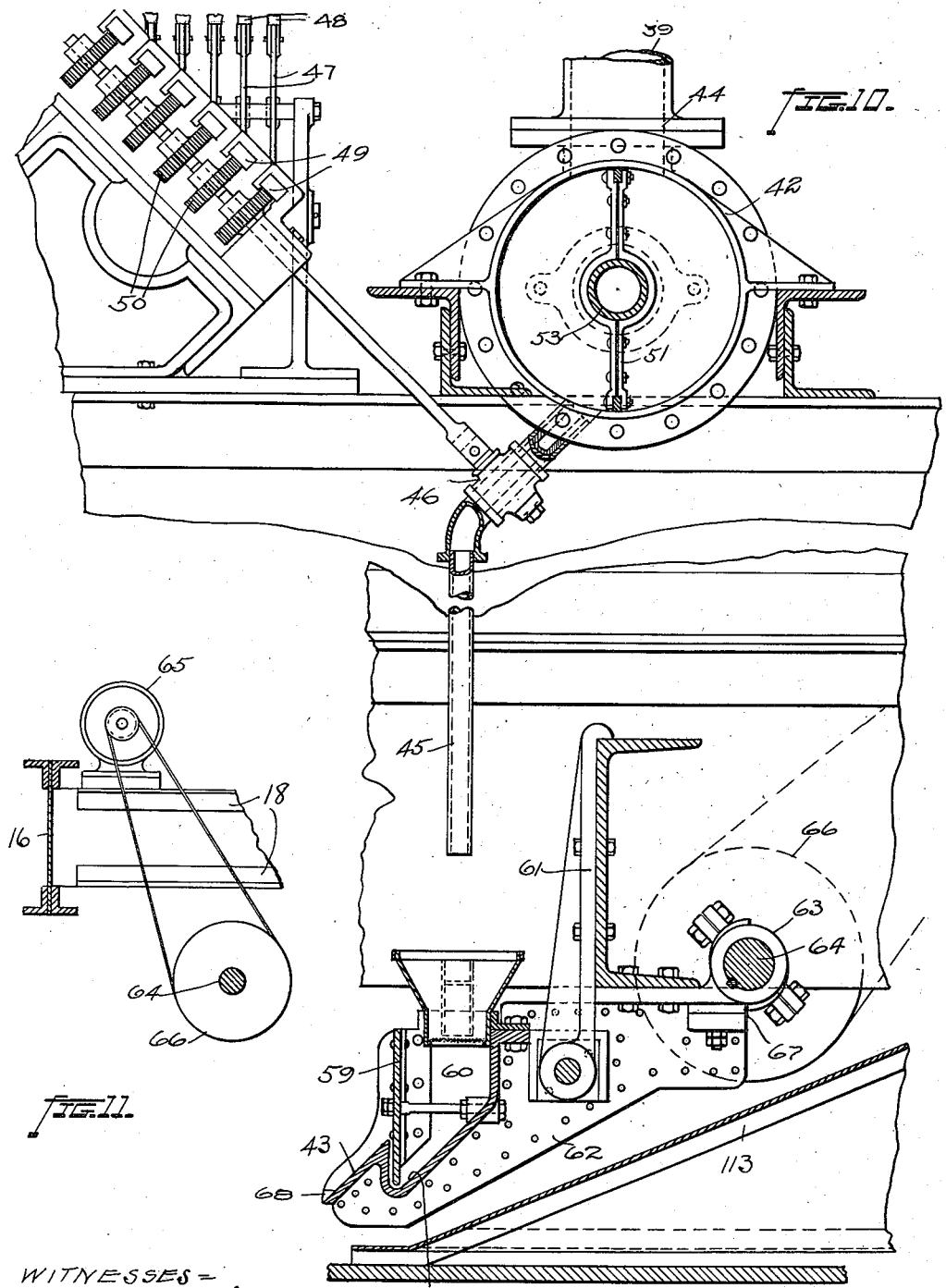

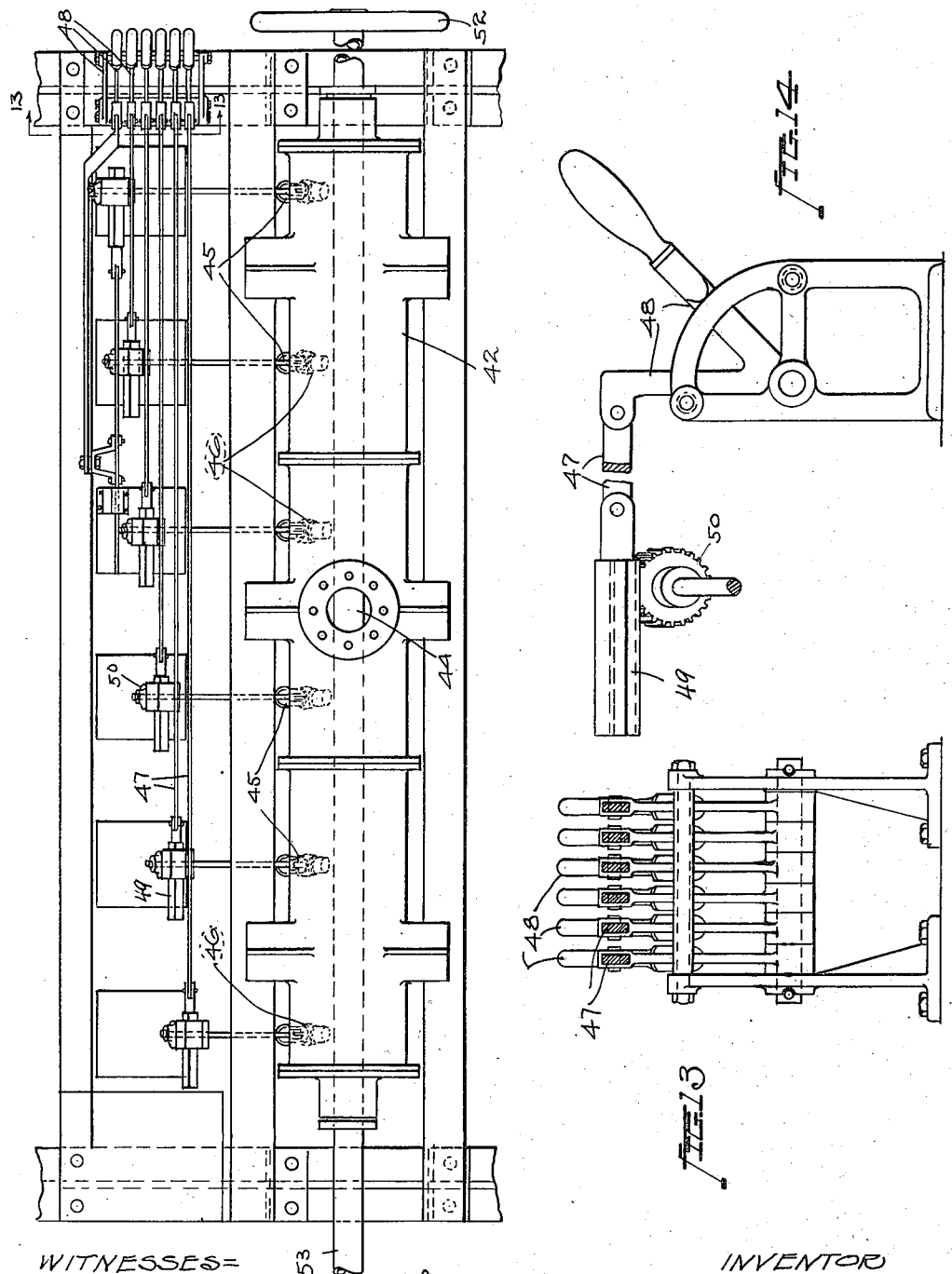

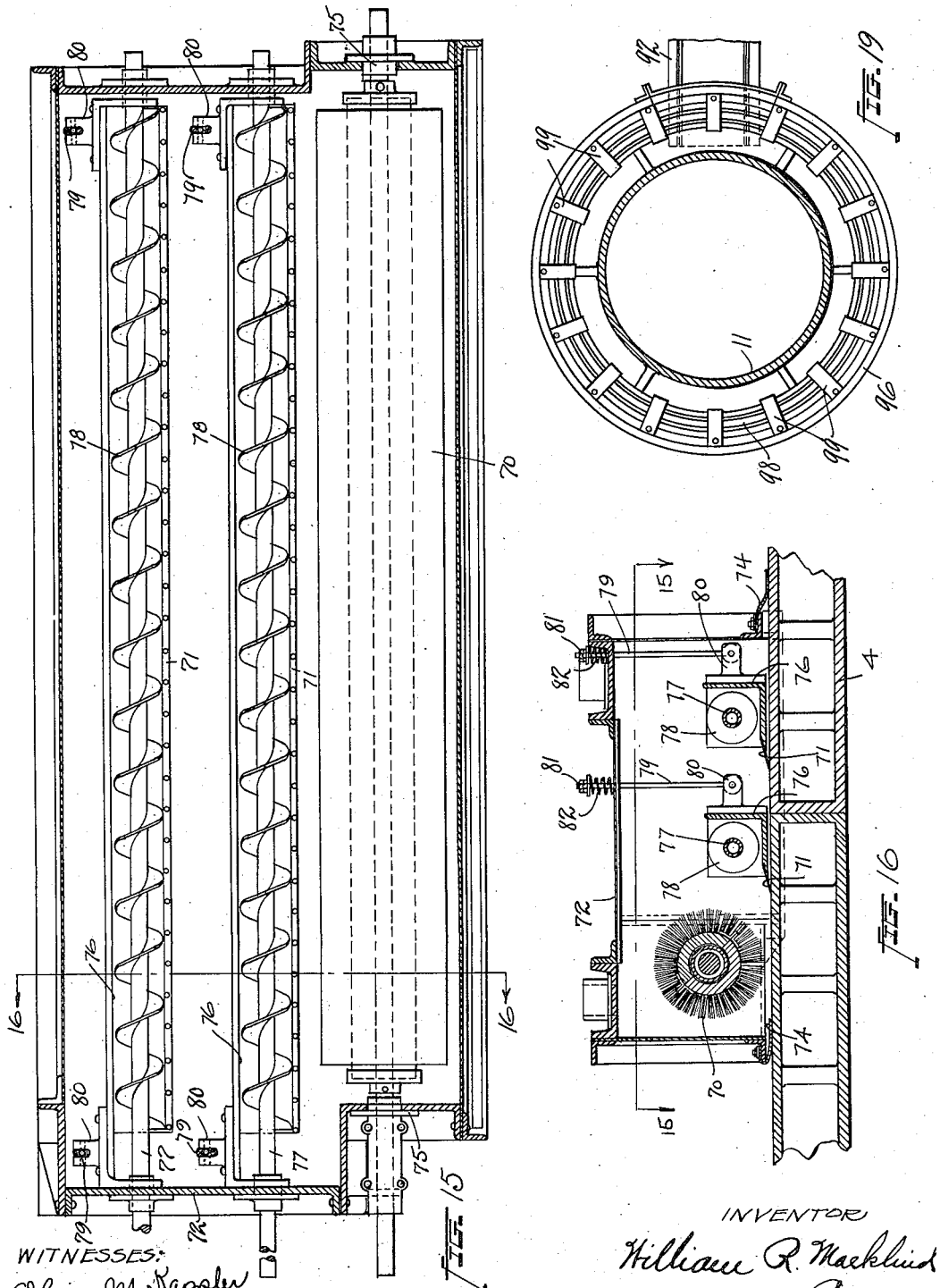

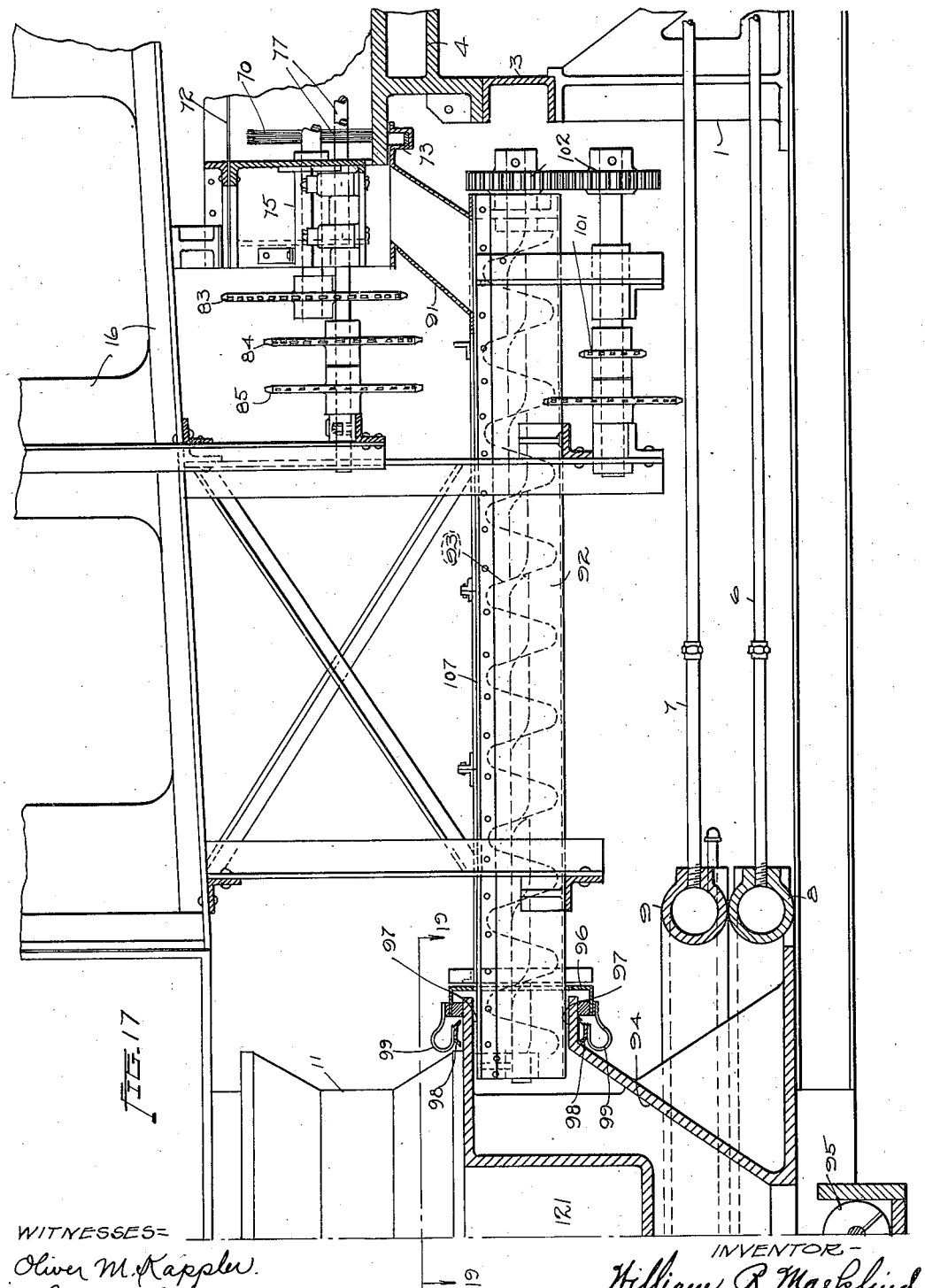

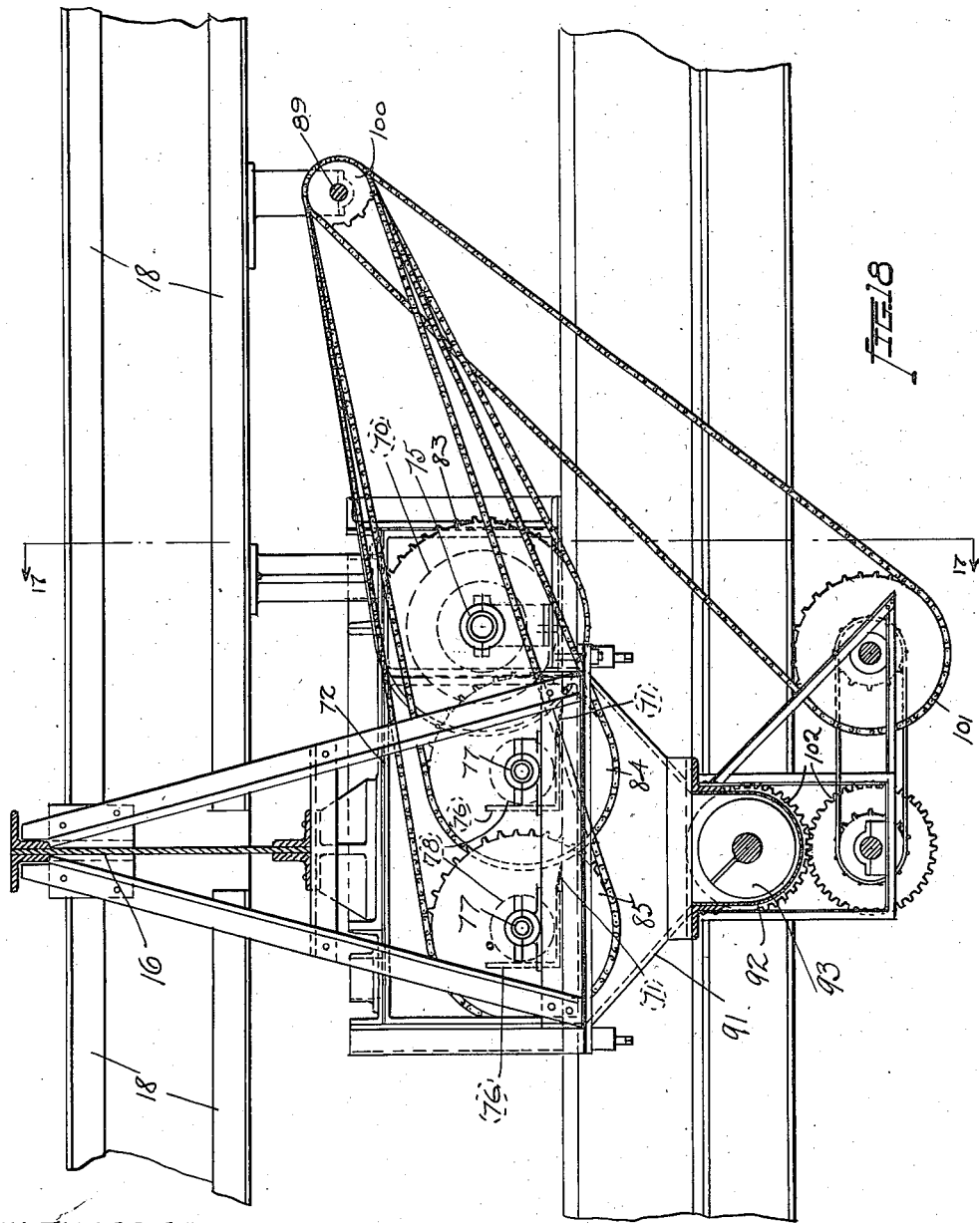

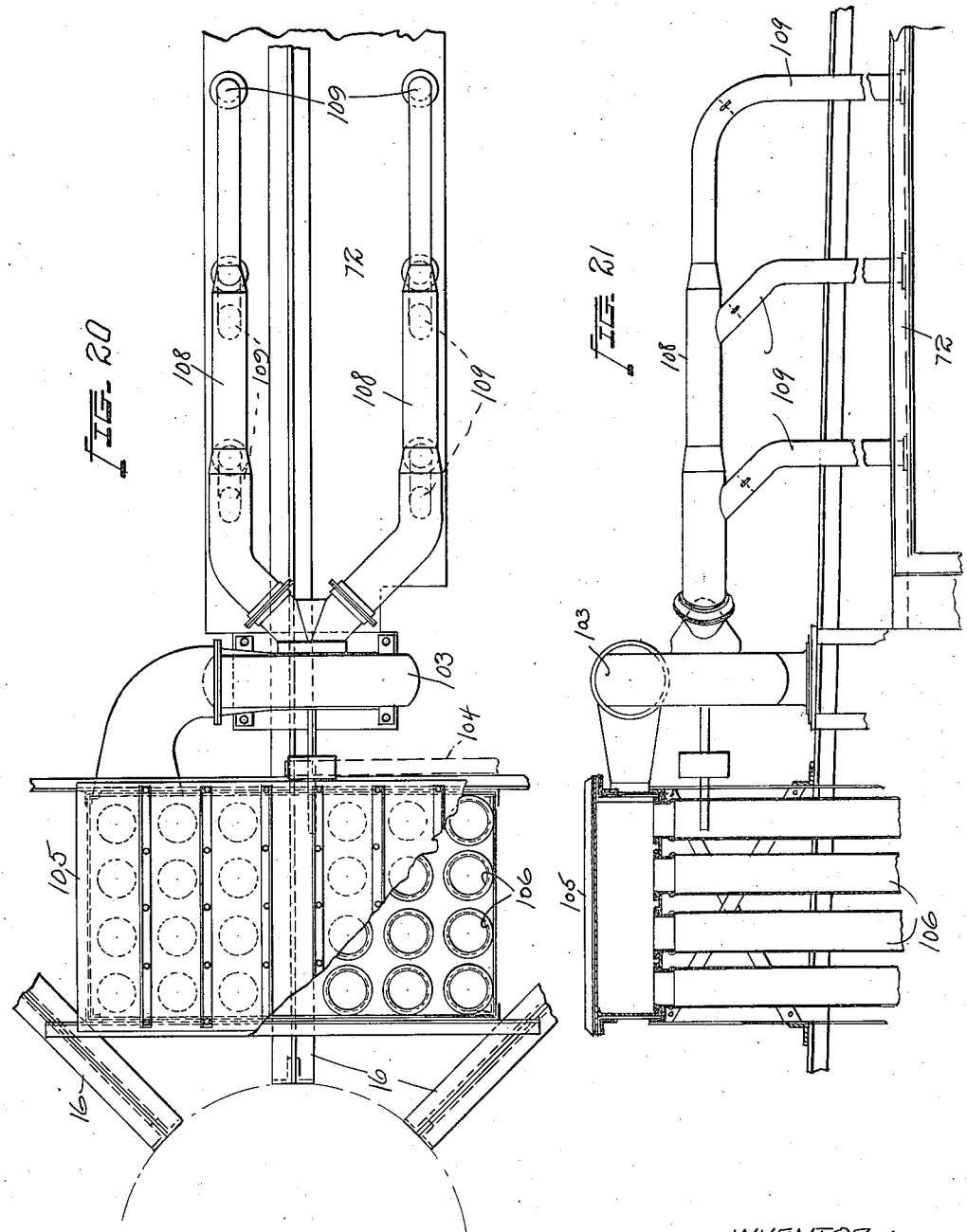

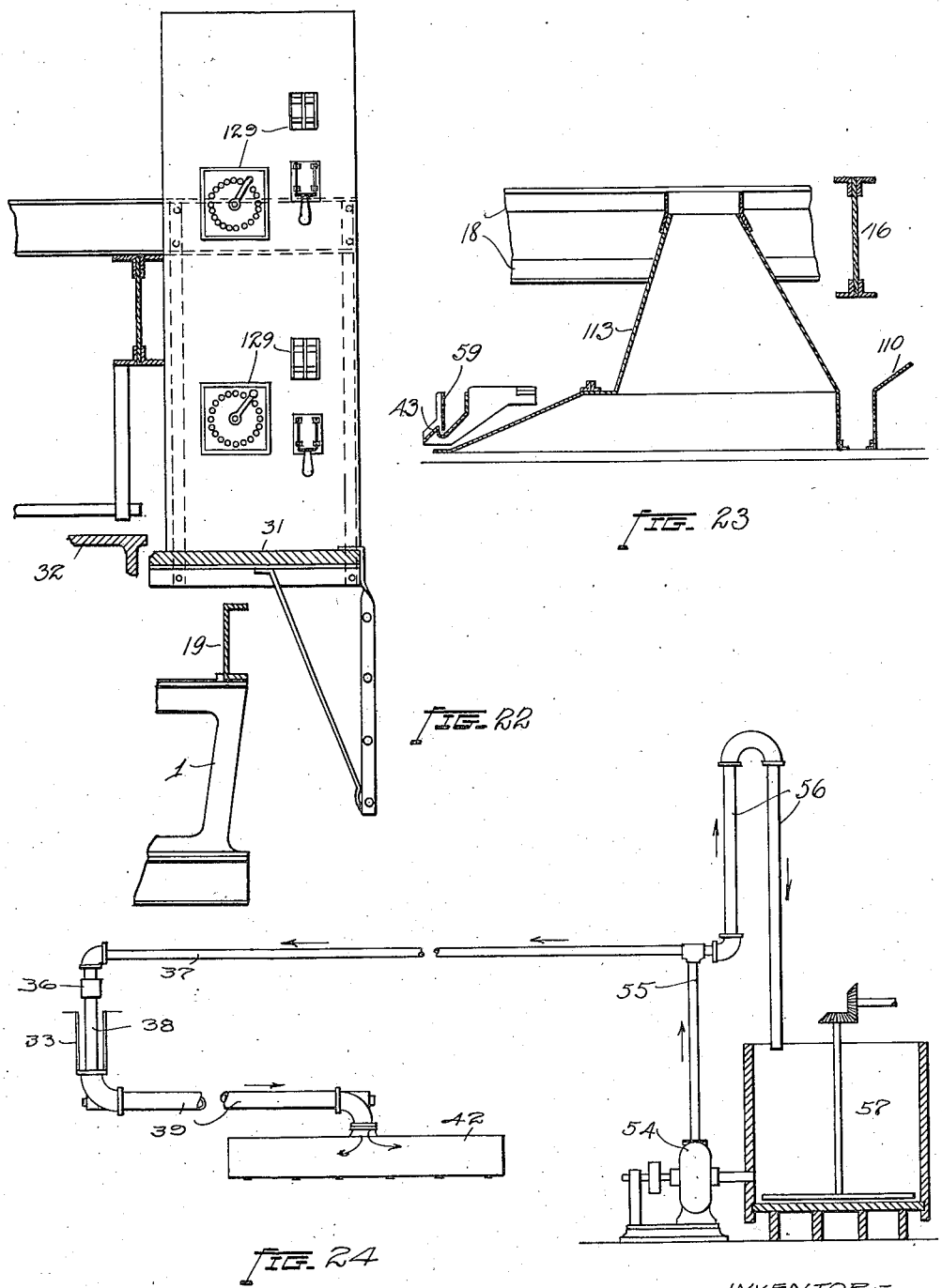

UNITED STATES PATENT OFFICE.

WILLIAM R. MACKLIND, OF CLEVELAND, OHIO, ASSIGNOR TO GEORGE A. MARTIN, TRUSTEE, OF CLEVELAND, OHIO.

DRYING MECHANISM.

1,191,921.  Specification of Letters Patent.  Patented July 18, 1916.

Application filed August 10, 1912. Serial No. 714,323.

*To all whom it may concern:*

Be it known that I, WILLIAM R. MACKLIND, a citizen of the United States, and a resident of Cleveland, county of Cuyahoga, and State of Ohio, have invented a new and useful Improvement in Drying Mechanism, of which the following is a specification, the principle of the invention being herein explained and the best mode in which I have contemplated applying that principle, so as to distinguish it from other inventions.

The present invention, relating, as indicated, to drying mechanism, has as its object the provision of a drying machine capable of handling wet, sludgy materials, which are known in commerce as pulps, both in mineral and vegetable products. For example, such pulp, as is well known, is produced in the manufacture of white lead and lead oxid, zinc oxid and other pigments. All of these materials when in the pulp state are more or less refractory, both in being subjected to drying means, and in letting loose of a certain percentage of the water which they carry. In the first instance the difficulty is in feeding, as the pulp must be constantly agitated, and then placed on drying means in a consistent form, or manner, or the drying will be unequal and hence unsatisfactory. In the second instance, even when relatively high temperatures are applied, owing to the tendency of their exterior or more exposed surfaces to dry first and so harden as to render the drying of the interior of the mass extremely slow and difficult.

By the improvements constituting the present invention, I propose not only to accomplish the quick and thorough drying of materials of the kind described, but I also propose to render such drying a continuous process so that there need be no interruption in the handling of the material, the wet sludge, or pulp, being supplied in a continuous stream to the drying machine, and the dry powdery product being similarly withdrawn. By this continuous and rapid method I will greatly reduce the cost of evaporating the water from the pulp which cost under present methods is very high, due to low efficiency of machines in use, and time they require to accomplish the drying.

It is a further object of the invention to provide against the escape of such dry powder into the surrounding atmosphere, this being highly objectionable in handling poisonous products, such as white lead; as also to provide for the collection and withdrawal of the vapors rising from the drying operation proper, so as to render it convenient and healthful to work about the machine.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—Figure 1 is a plan view, with parts broken away, of a drying machine embodying my present improvements; Fig. 2 is a sectional view, on a larger scale, of the left-hand portion of said mechanism, as shown in Fig. 1, the section being taken on a vertical central plane; Fig. 3 is a similar vertical section of the right-hand portion of the mechanism illustrated in Fig. 1; Fig. 4 is a part plan and part horizontal sectional view of one of the sections of the drying table which forms a feature of said mechanism; Fig. 5 is a side elevational view of a trolley employed in supplying electrical current to various motive devices included in the mechanism; Fig. 6 is a plan view of a trolley track wherewith said trolley contacts; Fig. 7 is a vertical sectional view of the motor and connected gearing whereby the mechanism as a whole is driven; Fig. 8 is a side elevational view of such gearing; Fig. 9 is a front elevation of the apparatus for feeding the material to be dried onto the drying table; Fig. 10 is a side elevation and transverse vertical section of the same; Fig. 11 is a more or less diagrammatic view illustrating the driving connections for operating said feeding apparatus; Fig. 12 is a plan view of said feeding apparatus; Fig. 13 is a transverse sectional view of the foregoing taken on the line 13—13, Fig. 12, and showing certain operating levers in elevation; Fig. 14 is a side elevational view of one of said operating levers detached from the others and showing the connections between the lever and the valve which it operates; Fig. 15 is a horizontal sectional view of the apparatus for removing the dried material from the table; Fig. 16 is a transverse sectional view of such removing apparatus taken on the line 16—16, Fig. 15; Fig. 17 is a vertical sectional view taken in a radial plane (indicated by the line 17—17, Fig. 18) with reference to the central axis of the mechanism and showing the conveying means leading from such removing apparatus to the center of the machine where such material is discharged; Fig. 18 is a transverse sectional view of such conveying mechanism; Fig. 19 is a horizontal sectional view of the inner end of the conveying mechanism and the hopper into which such end discharges, the plane of the section being indicated by the line 19—19, Fig. 17; Fig. 20 is a plan view, with parts shown in section, of a suction apparatus associated with said material removing apparatus and designed to prevent the escape of dust incidental to the removal of the dried material from the drying table; Fig. 21 is a side elevational view and partial section of such suction apparatus; Fig. 22 is a transverse sectional view in a vertical plane of the operator's platform from which the operation of the mechanism as a whole, together with the operation of its several parts, is controlled; Fig. 23 is a transverse sectional view of a portion of the vapor collecting apparatus whereby the vapors arising from the drying material are removed; and Fig. 24 is a more or less diagrammatic view illustrating one approved method of feeding the material to be dried to the feeding apparatus of the machine.

The general features of construction characterizing the illustrative form of my improved machine shown in the foregoing drawings comprise first an annular, substantially horizontally disposed drying table in connection with which suitable heating means are provided. In coöperative relation to said table are then provided a feeding apparatus for depositing onto the table a layer or film of the material to be dried; an apparatus for removing the vapor or moisture arising from the drying of such deposited material; and an apparatus for removing from the table the dried material and discharging the same from the machine.

The foregoing features will be described in the order in which they have just been noted, along with incidental items of frame structure and associated operative details.

The drying table A, as already indicated, is of annular form and is supported by means of a series of suitable supporting stands 1 upon the foundation 2, (Figs. 2 and 3). The table proper is built up of a plurality of contiguous sections that are supported upon said stands by means of inner and outer channel rings 3. The sections are in the form of sectors 4 and are hollow, the upper and lower walls being connected together by webs, 5 as shown in the figures just named and in Fig. 4. Pipes 6 and 7 for supplying steam and removing the water of condensation, respectively, are provided in connection with each sector, the last-named pipes being connected to the inner ends of the sectors and the bottom walls of the latter sloping toward such inner ends so as to cause the condensed water to drain naturally away. These pipes are radially disposed and are connected at their inner ends to circular headers 8 and 9, respectively; while a common steam supply source is thus provided, it will be observed that the amount of steam supplied to each sector is independently regulable so that the temperature of the upper face of the assembled table may be regulated so as to vary at different points around the circle. Such upper face is designed to be smooth and polished and the sectors accurately joined together so that a practically uninterrupted surface is provided around the entire extent of the table.

While the size of the table, that is the area of its drying surface, will of course vary with the capacity desired, I have found it advantageous to preserve a certain relation between said table's inner and outer diameters in order to secure the best and most uniform drying results. It is accordingly recommended that the minimum ratio of the outside diameter to the inner diameter be as 1.3 to 1 and that the maximum ratio of such diameters be as 1.5 is to 1. Furthermore, in order that the material feeding and removing apparatus may operate well within the edges of the table thus insuring against the escape of material over such edges, the latter are made to extend beyond the edges of the hollow heating-chambers so that the surface of the table will be flanked, both on the inside and the outside, by a non-drying space.

Substantially all the remaining parts of the drying machine are in the present construction supported by a rotatable frame (Fig. 1), which carries such parts in proper coöperative relation to the table and also supports the necessary operating mechanism therefor. It will be understood, of course, that if found feasible, by reason of variation in size, or for other reasons, to rotate the table instead of the supporting frame this may be very well done, so far as the principles of operation involved are concerned. The center of said rotatable frame is a cast iron spider 10 rotatably mounted on a central column 11 having a flanged top and a centering sleeve 12, (Figs. 2 and 3). A ball bearing is interposed between the under face of the spider and said flange, while a roller bearing 14 is similarly provided between the centering sleeve and an internal annular flange 15 of the spider. While the latter is thus securely mounted on the centering column, it is nevertheless, possible, by simply raising the same a short distance, as is entirely feasible by means of jacks or the like, to lift the centering sleeve 12 and thereby withdraw the rings or raceways of the ball bearing for the purpose of repair or renewal. This construction at the same time facilitates similar attention being given to the roller bearing 14, since by raising the sleeve the rings of the latter bearing are longitudinally spaced.

A plurality of arms 16, fabricated of structural steel, extend radially from spider 10 to beyond the outer edge or periphery of the annular drying table, such outer arm-ends being spaced from the surface of the table a sufficient distance to provide the necessary clearance for the parts suspended therefrom, as will be presently described. Two series of frame struts, an outer series 17 and an inner series 18, are bolted to said radial arms, the former to the extreme outer ends of the arms, and the latter at a point substantially the same radial distance from the central axis of the machine as the inner edge of the annular table. It is not intended to support the entire weight of this rotatable frame from the central column 11, but, at least in a large machine such as the one illustrated, a circular track 19 is provided on the outer stands 1 of the annular table. Upon this track rollers 20, that are mounted in brackets 21 extending downwardly from the outer ends of the respective radial arms 16, are adapted to run. In connection with this same circular track is provided an annular rack 22 having its teeth directed inwardly, such rack being utilized in effecting the rotation of the frame, as shown in detail in Figs. 7 and 8. To this end there is provided a pinion 23 that meshes with said rack, said pinion being carried by the lower end of a vertically disposed shaft 24 secured in suitable bearings 25 and 26 in the outer end of one of the radial arms of the frame and on the adjacent bracket 21, respectively. An electric motor 27 supported on such arm serves to drive this shaft 24 through the medium of a sprocket chain 28, shaft 29 and worm gearing 30.

The apparatus B for feeding the material to be dried onto the drying table, and the apparatus C for removing such material after it has been dessicated, are both desirably supported from the rotary frame just described in rather close relation. Hence as will appear from the plan view of Fig. 1, the removing apparatus is attached to and directly under one of the radial arms 16, while the feeding apparatus is supported from the inner and outer struts 17 and 18 that join the aforesaid radial arm with the one next following after, having regard to the direction of rotation of the frame as a whole, which is indicated by the arrow in the figure just referred to. Not only may a single operator thus supervise both the feeding and removing apparatus, but substantially the entire extent of the table is available for drying purposes, the layer of wet material being spread on said table immediately following the removing apparatus, which takes up and carries away the previously deposited layer, now dried.

For the accommodation of the operator a platform 31 is provided parallel with the outer strut 17 from which the feeding apparatus B is supported, and a crossing 32 is disposed at right angles to said platform between said feeding apparatus and the removing apparatus C, so that the operator can, if necessary, reach any portion of both.

The sludge, or equivalent material to be dried, is conducted to the feeding apparatus B from a central vertically arranged tubular column 33 that has an upper flanged end and is laterally inclosed by a relatively stationary section 34 of a vapor drum, to which more particular reference will be hereafter made. The flanged end of the column 33 has bearing contact with the annular base of a support 35 for a connection or union 36 whereby an exteriorly supported supply pipe 37 (shown in Fig. 24), is joined with a supply pipe 38 carried by said column and connected by means of an elbow at the lower end of the latter with a radially disposed pipe 39 that leads out to the feeding apparatus. The column 33 is supported in the fashion just described by means of a spider 40, the arms of which are attached at their outer ends to the lower section 41 of the aforesaid vapor drum, such section being attached to and rotating with the main frame of the machine.

In the feeding apparatus B, the sludge from supply pipe 39 is initially received in a tank 42 from which it is subsequently discharged onto a feeding table 43, all fully shown in Figs. 9 and 10. Said tank 42 is provided with an inlet opening 44 on top for connection with the supply pipe and is provided on its bottom side with a plurality of outlets 45 (six as shown) separately controlled by means of valves 46. All of these valves are conveniently operable from the operator's platform 31 by means of connecting rods 47 that lead from the valves to a bank of levers 48 at one end of the feeding apparatus adjacent to such platform, (see Figs. 12, 13 and 14), said connecting rods being formed with short racks 49 adapted to mesh with pinions 50 on the stems of the valves. It will be readily seen that by means of the aforesaid valves the rate of flow of the sludge from the tank onto the feeding table 43 can be nicely graduated so as to cause a layer or film of material of uniform thickness to be spread across the table. An agitator 51 within the tank serves to stir up the contents of the latter and maintain the mixture of uniform consistency, said agitator being operable by means of a hand wheel 52 at the outer end of its shaft 53.

It will be understood that the supply tank 42 is not only kept full of material, but that such material is desirably maintained under a constant head so as to insure an unvarying rate of feed from the several valve-controlled outlets with any given adjustment of said valves. Such constant head may be secured by means of the arrangement illustrated in Fig. 24, which diagrammatically shows the supply tank just described, together with the connecting pipes 38 and 39 carried by the rotatable frame. At a point removed from the machine, a pump 54 is connected with the exteriorly supported pipe 37 that is connected with the stuffing box or union 36, such pump discharging more directly into a stand-pipe 55 that connects the same with said pipe 37 and has an overflow 56 of predetermined elevation back into the tank 57 from which the supply of material for the pump is drawn. If, accordingly, the pump be governed to supply an excess of material, that is more than will be withdrawn from the supply tank 42 carried by the drying machine, the sludge in such supply tank will be under a constant pressure determined by the elevation of the upper end of the overflow pipe 56.

The feeding table 43, that receives the material from the several outlets 45 of the supply tank consists, in effect, of an inclined plate having a longitudinally extending V-shaped depression or trough 58 in which the material is received from the aforesaid outlet pipes. The trough-like character of this depression is further heightened by a vertically disposed plate 59 that lies therein parallel with, but removed a trifle from, the front wall of said recess. The ends of the trough 58 are closed by transverse plates 60. The plate 59 acts as a dam and the material received in the trough-like receptacle formed by said plate wells up between the front face of the latter and the front wall of the depression until it overflows the crest of such depression and then runs down over the lower edge of the inclined plate 43.

The entire feeding table, or shaker board, as it may be called, is oscillatorily hung from the supporting frame of the machine by means of downwardly depending brackets 61 (see Fig. 10), to which the end plates 60 and other intermediate plates 62, that are attached to the shaker board, are hinged. The excess of weight lies in front of the pivotal axis thus formed so as to normally retain the rear ends of the side plates 60 and intermediate plates 62 (which are extended for this purpose) in engagement with cams 63 on a longitudinally disposed cam shaft 64. Such shaft is rotated by a suitable motor 65 disposed adjacent to the inner end of the feeding apparatus and belted to a pulley 66 on the shaft, as shown in Figs. 1 and 11. Cams 63 will obviously serve to oscillate the table about its pivotal axis and incidentally jar the same, hardened plates 67 being provided on the cam-engaging ends of plates 60 and 62 to receive the wear. Along the lower edge of the shaker board, finally, there is provided a series of equidistantly spaced teeth 68. Accordingly, while the material overflows from the trough in the form of a broad flat ribbon-like stream of uniform depth, the effect of these teeth is to break up this broad stream into a multitude of tiny streams that trickle the material onto the drying table in the form of drops. The object, in other words, is to supply these drops in such size and frequency and spaced relation as to just spread over the surface of the table and no more, since I have found that a layer deposited in this fashion dries much more readily than if deposited as a sheet or ribbon, each little drop of material drying out independently of the other.

The apparatus for removing the dried material is shown in detail in Figs. 16 to 19 inclusive and consists essentially of a brush 70 adapted to contact with the surface of the drying table A and followed by one or more scrapers 71 which gather up the material loosened by the brush, two such scrapers being employed in the machine illustrated. Both the brush and the scrapers are inclosed in a tight casing 72 that surrounds the same on all sides having close fitting contact with the drying table at its outer and inner edges, and depending into substantial contact with the surface of the same on either side of the removing apparatus. Such contact, in the case of the inner table edge, is secured with the under surface of such edge, which projects beyond the body of the table with this object in view, the casing 72, or rather the hopper 91 extending downwardly therefrom, being provided with an inwardly bent lip 73 faced with packing material. Close contact, in the case of the front and back walls of the casing is preserved by means of strips 74 of flexible material that depend from said walls' lower edges and drag along the surface of the table (see Fig. 16). Such front and back walls of the casing may be removed in order to obtain access to the brush and the scrapers, respectively.

As shown in Figs. 3 and 18, the inner and outer ends of the brush spindle are carried in bearings 75, which may be made vertically adjustable whereby the degree of pressure exerted by the brush on the drying table may be varied, as desired. Each scraper consists of a strip of thin metal attached to the lower edge of an angular trough member 76 that is hung from the spindle 77 of a conveyer screw 78 disposed to fit snugly in said trough member. Rods 79, connected with brackets 80 that project rearwardly from the conveyer troughs, extend upwardly through the top of casing 72 where they are secured by nuts 81, compression springs 82 being interposed between said nuts and casing. By means of these nuts it will be evident that adjustment of the scrapers relatively to the surface of the drying table may be made. For the purpose of driving or rotating the brush and the conveyers they are provided at their inner ends with a series of sprockets 83, 84 and 85 which are connected with a corresponding series of sprockets 86, 87 and 88 on a jack-shaft 89 driven from a motor 90 as shown in the plan view of Fig. 1 and in the side elevational view of Fig. 18.

In operation, it will be understood that the brush is designed simply to loosen and render fragmentary the layer or deposit of dried material on the table. The first scraper 71 will then pick up substantially all of such loosened material, the second being merely provided to insure the thorough and complete removal of the material. The conveyers 78, in operative conjunction with the scrapers, carry the material to the inner ends of the scraper troughs 76 so as to discharge the material into a hopper 91 that is suspended from and integral with the adjacent end of the casing 72 inclosing the removing apparatus. This hopper has a close fitting contact with the under edge of the table, by virtue of the lip 73 of the casing, previously described, so that no dust can escape.

Leading from the hopper is a conveyer trough 92, radially disposed with respect to the axis of the machine and having a screw conveyer 93 whereby the material received in said hopper 91 is carried to an inner conical hopper 94 formed integrally in the central column 11 whereon the rotatable frame of the machine is supported. This hopper 94 opens at its lower end into another conveyer 95 by means of which the material may be carried to any suitable discharge point away from the machine. The inner end of the conveyer 93, that extends from the removing apparatus to this central hopper 94, desirably has a close fitting connection with the opening in the latter, which must necessarily extend entirely around said hopper. Connection of the conveyer with the hopper is accordingly in the form of an annular closure 96 having a tight fitting contact with the lateral flanges 97 disposed above and below such opening, as shown in detail in Figs. 17 and 19. A tight, dust-proof fit between this closure and the flanges 97 is insured by the use of packing rings 98 that are held in contact with the flanges by means of resilient members 99.

The driving of the screw conveyer 93 is accomplished by means of the same motor 90 that drives the removing apparatus C, proper. To this end another sprocket 100 is provided on jack-shaft 89 (Fig. 1), said sprocket being connected with a sprocket 101 located below the trough 92 that is in turn connected with the conveyer by intermediate gearing 102.

Despite the fact that the casing 72 that incloses the removing apparatus, proper, fits the drying table A as closely as possible, there will, nevertheless be some dust or finely powdered material escape into the outer atmosphere unless additional precautions be taken. Such additional precautions comprise a suction fan 103 (Figs. 1, 3, 20 and 21) connected to be driven from the same jack shaft 89 as the removing apparatus C and conveyer 93 just described, by means of a belt 104. The intake to such dust fan leads from the casing 72 that incloses the aforesaid apparatus, while the discharge takes place into a dust collector head 105 from which depend a plurality of bags 106, of familiar construction, which allow the air to pass readily through but retain any dust that may be carried thereby. The lower ends of the bags are normally tied shut, but when a sufficient amount of dust accumulates therein to render such procedure, desirable, they may be raised, and by tying the bags at an intermediate point and opening such ends, such dust may be dropped into the conveyer, a removable cover 107 being provided in the conveyer trough at a convenient point.

The preferred arrangement of intake is that shown in detail in Figs. 20 and 21 and consists of two branched trunks or pipes 108, extending in a horizontal direction over the casing 72 and increasing in diameter toward their fan-ends at each juncture of the branches 109 therewith.

By the foregoing described means the dust which is collected by the fan is joined to the bulk of the material that is directly carried off by the removing apparatus. It will be understood that only a moderate suction requires to be produced by the fan, the only object being to produce a slight draft at the joints where the casing 72, that incloses the removing apparatus, fits the edges and surface of the drying table. This will serve to prevent any dust escaping into the outer atmosphere without imposing on the fan the duty of removing any considerable body of the material.

It will be understood that the drying table of the machine has a considerable superficial area, and there will be produced in drying materials, such as those in mind, such a considerable volume of vapor or steam as to be objectionable, especially under certain weather conditions and in buildings more or less inclosed. I accordingly provide means for withdrawing and removing from the apparatus substantially all such vapor, said means comprising a series of vapor collectors discharging into the central drum made up of the stationary section 34 and the rotatable section 41, hereinbefore described. The collectors themselves are in the form of hoods disposed between successive radial arms of said frame and are all similar with the exception of one of special construction that is mounted next to the feeding apparatus B. Each of said similar collectors is made up of two side members 110 and a central key-member 111 supported from the radial arms 16 by means of rods 112 (Figs. 1 and 2) as need not be explained in detail, the lower edges lying close to the upper surface of the drying table. The specially constructed collector 113 adjacent to the feeding apparatus is shown in transverse section in Fig. 23 and differs from the other duplicate sections only in the matter of size, consisting of a single member which is furthermore provided at its forward edge with an extension that projects under the shaker-board 43 and substantially even with the fore edge thereof, so that the vapor produced by the material dropping from the shaker-board onto the drying table is immediately caught by the collector. This is highly important for the reason that obviously the greater bulk of the vapor driven off during the drying operation is driven off at this stage, less and less evaporation occurring as the drying progresses. Leading from this special collector 113 adjacent to the feeding apparatus and from the central member 111 of each of the duplicate collectors, is a radial vapor-pipe 114 that is connected with the rotatable section 41 of the central vapor drum. A water-sealed joint 115 forms a tight closure between this section and the upper stationary section 34 of said drum, with which latter section is connected the main discharge vapor pipe 116. Said pipe 116 may lead to any suitable point without the building or structure in which the drying machine is housed. A suitable draft should be induced in this vapor discharge pipe either by means of a fan 117 or the like located at its outer end, as shown in Fig. 2, or by connecting such outer end with a stack, all as will be readily understood.

Inasmuch as the vapor will naturally tend to condense more or less, incidentally to its collection by the pipes 113 and the drum into which they discharge, such pipes are arranged to incline downwardly toward the drum, and the latter is provided in its bottom with drain pipes 118 that lead to an annular trough 119 supported upon the central column 11 by means of the centering sleeve 12. This trough is, in turn, provided with a drain pipe 120 that leads to a central pocket 121 in the column having an exterior discharge (not shown).

Current for the operation of the several motors, which are carried by the rotating frame of the machine, viz., motor 27, which serve to drive the frame itself, motor 65 which operates the feeding apparatus, and motor 90 which operates the removing apparatus, together with the conveyer leading therefrom and suction fan 103, is supplied from circular tracks or trolleys 122 supported on arms or brackets 123 that extend radially from the central column 11, see Figs. 1, 5 and 6. Such tracks 122 are suitably insulated from the arms and are connected with leads from the exterior circuit, of which no showing is deemed necessary. Pivotally supported from a pair of brackets 124, attached to the under side of one of the arms 16 of the frame, so as to be carried around therewith, are contact shoes or trolleys 125 which contact with circular tracks 122, respectively, said shoes being insulated from the frame as is shown in Fig. 5. These shoes are resiliently pressed against the tracks by means of springs 126, and from them are led the conductors 127, which supply the current to the several motors previously referred to. It has not been thought necessary to illustrate the detailed wiring connections, or circuits for said motors, as these will be readily understood. It should be added, however, that the switches and rheostats 129, interposed in the motor circuits for controlling the current supplied to each of these motors, are mounted at points conveniently adjacent to the operator's platform 31, (see Figs. 1 and 22). In this way, not only may the operator directly supervise and adjust the feeding apparatus B and the removing apparatus C from said platform, but he also has directly at hand these switches and rheostats for controlling the speed at which the machine frame rotates, as well as the speed at which each apparatus shall be operated.

The general operation of the machine just described will only require the briefest attention, such operation having been in the main clearly indicated by the description of the several component parts and mechanisms that enter into the construction of said machine. Assuming that a suitable supply of material is being furnished under a predetermined head by pump 54 (Fig. 24), and that the feeding apparatus B has been properly adjusted by means of the several levers 48 which control the valves 46, a thin film or layer of the sludge or other material to be dried, will be deposited on the surface of the drying table A. This film will not be deposited stricly as a sheet, but will consist of a collection of tiny drops, which, although they coalesce as they fall onto the drying table, nevertheless preserve their individuality sufficiently to dry separately, each forming a tiny crater whereby the prompt and thorough drying of the deposited layer as a whole is insured.

In the operation of the machine, it has been previously indicated that the removing apparatus C immediately precedes this feeding apparatus B, such removing apparatus breaking up and carrying to the inner edge of the annular table the layer of material deposited upon the previous round. This dried material, as it drops over the inner edge of the table, is caught in the hopper, or chute 91, and is thence carried by conveyer 93 to the central hopper 94, and so away out of the machine.

By means of the suction fan 103, the air pressure within the casing 72, which incloses the aforesaid removing apparatus, is lowered sufficiently to prevent the escape of any dust that may be caused by the breaking up of the material under the action of the revolving brush 70 and the scrapers 71. It is not the object, however, of this fan to create so strong a suction as to carry from the branched trunks 108 more than a minimum amount of the material, incidentally to the accomplishment of the foregoing object. This dust is collected in the bags 106 and added from time to time to the greater bulk of the material that is being constantly conveyed to the central hopper by the conveyer 93.

It has been pointed out that the particular machine, chosen for the purpose of illustrating the invention, is a relatively large one, adapted for the handling of a considerable quantity of sludge, and certain of the features hereinbefore described are more particularly adapted for use in connection with a machine of such large size and capacity. It is not intended, however, to imply by this that the machine is not equally adaptable for use in operations of a smaller scale, and in handling other materials than the particular one in hand; and in such cases various modifications will readily suggest themselves, and it may also be unnecessary to utilize all of the features characterizing the complete apparatus herein illustrated and described. By means, however, of such machine, even reduced to its fewest essential elements, a very much more rapid and efficient drying of materials of the general class previously referred to is obtainable: even the more refractory yield up their content of water completely and all conditions are arranged to hasten evaporation so far as possible. The machine is furthermore highly flexible in operation, being readily accommodated not only to materials of different characters but also to different conditions of material and otherwise. Finally where poisonous materials are being handled, the ability to confine all dust and convey the material from the machine without exposure of the operator in any way is highly important not only to his health but convenience as well.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In drying mechanism, the combination of an annular drying table; a column centrally disposed with respect to said table; a vertically removable sleeve mounted in such upper column end; a frame comprising a central spider surrounding said sleeve and radial arms extending over said table; said spider being rotatably supported upon said column; and material feeding and removing means carried by said frame in operative relation to said table.

2. In drying mechanism, the combination of an annular drying table; a column centrally disposed with respect to said table; a vertically removable sleeve mounted in such upper column end; a frame comprising a central spider surrounding said sleeve and radial arms extending over said table; means rotatably supporting said spider from said column; and material feeding and removing means carried by said frame in operative relation to said table.

3. In drying mechanism, the combination of an annular drying table; a column centrally disposed with respect to said table and laterally flanged at its upper end; a vertically removable sleeve mounted in such upper column-end; a frame comprising a central spider surrounding said sleeve and radial arms extending over said table; ball-bearings interposed between said spider and the flange on said column, whereby said frame is rotatably supported on the latter; and material feeding and removing means carried by said frame in operative relation to said table.

4. In drying mechanism, the combination of an annular drying table; a column centrally disposed with respect to said table and laterally flanged at its upper end; a vertically removable sleeve mounted in such upper column-end; a frame comprising a central spider surrounding said sleeve and radial arms extending over said table; ball-bearings interposed between said spider and the flange on said column, whereby said frame is rotatably supported on the latter; roller bearings interposed between said spider and said sleeve; and material feeding and removing means carried by said frame in operative relation to said table.

5. In drying mechanism, the combination of an annular drying table; a frame rotatably supported on said table; material feeding and removing means carried by said frame in operative relation to said table; electric motors for operating said feeding and removing means; and electric connections for said motors including circular trolley-tracks at the center of said table and trolleys carried by said frame and contacting with said tracks.

6. In drying mechanism, the combination of an annular drying table; a column centrally disposed with respect to said table; a frame rotatably supported on said column and extending over said table; material feeding and removing means carried by said frame; electric motors for operating said feeding and removing means; and electric connections for said motors including circular trolley-tracks supported from said column and trolleys carried by said frame and contacting with said tracks.

7. In drying mechanism, the combination of an annular drying table; a column centrally disposed with respect to said table; a frame rotatably supported upon said column and comprising radial arms extending over said table; material feeding and removing means carried between two of said arms in operative relation to said table; an operator's platform supported from said arms adjacent to said feeding and removing means; electric motors for operating the latter; electric connections for said motors including contact means with an exterior circuit; and current controlling means in said connections located over said platform.

8. In drying mechanism, the combination of an annular drying table; a column centrally disposed with respect to said table; a frame rotatably supported upon said column and extending over said table; material feeding and removing means carried by said frame in operative relation to said table; said removing means being disposed in advance of said feeding means having regard to the direction of rotation of said frame; and vapor collecting means carried by said frame between said removing means and feeding means, having regard to such direction of rotation.

9. In drying mechanism, the combination of an annular drying table; a column centrally disposed with respect to said table; a frame rotatably supported upon said column and extending over said table; material feeding and removing means carried by said frame in operative relation to said table; said removing means being disposed in advance of said feeding means, having regard to the direction of rotation of said frame; connections leading from the central axis of said table to said feeding means; conveying means leading from said removing means to such axis; said connections and conveying means being both carried by said frame; and vapor collecting means carried by said frame between said removing means and feeding means, having regard to such direction of rotation.

10. In drying mechanism, the combination of an annular drying table; a column centrally disposed with respect to said table; a frame rotatably supported upon said column and extending over said table; material feeding and removing means carried by said frame in operative relation to said table; connections leading from the central axis of said table to said feeding means; conveying means leading from said removing means to such axis, said connections and conveying means being both carried by said frame; vapor collecting means carried by said frame between said removing means and feeding means, having regard to such direction and rotation; and a centrally located vapor drum connected with said vapor collecting means.

11. In drying mechanism, the combination of an annular drying table; a column centrally disposed with respect to said table; a frame rotatably supported upon said column and extending over said table; material feeding and removing means carried by said frame in operative relation to said table, said removing means being disposed in advance of said feeding means, having regard to the direction of rotation of said frame; connections leading from the central axis of said table to said feeding means; conveying means leading from said removing means to such axis, said connections and conveying means being both carried by said frame; an axial feed pipe adapted to supply material to be dried to said connections; a hopper in said column adapted to receive the dried material from said conveying means; and vapor collecting means carried by said frame between said removing means and feeding means, having regard to such direction of rotation, whereby the vapor from the material spread on the table may be continuously removed.

12. In drying mechanism, the combination of an annular drying table; a column centrally disposed with respect to said table; a frame rotatably supported upon said column and extending over said table; material feeding and removing means carried by said frame in operative relation to said table, said removing means being disposed in advance of said feeding means, having regard to the direction of rotation of said frame; connections leading from the central axis of said table to said feeding means;

conveying means leading from said removing means to such axis; said connections and conveying means being both carried by said frame; an axial feed pipe adapted to supply material to be dried to said connections; a hopper in said column adapted to receive the dried material from said conveying means; vapor collecting means carried by said frame between said removing means and feeding means, having regard to such direction of rotation, whereby the vapor from the material spread on the table may be continuously removed; and a centrally located vapor drum connected with said vapor collecting means.

13. In drying mechanism, the combination of an annular drying table; a column centrally disposed with respect to said table; a frame rotatably supported upon said column and extending over said table; material feeding and removing means carried by said frame in operative relation to said table, said removing means being disposed in advance of said feeding means, having regard to the direction of rotation of said frame; and a vapor-collecting hood of general annular form carried by said frame between said removing means and feeding means, having regard to such direction of rotation, whereby the vapor from the material spread on the table may be continuously removed.

14. In drying mechanism, the combination of an annular drying table; a frame rotatably mounted centrally of said table and extending thereover; material feeding and removing means carried by said frame in operative relation to said table; said removing means being disposed in advance of said feeding means with respect to the direction of rotation of said frame; and vapor collecting means carried by said frame between said removing means and said feeding means with respect to such direction of rotation.

15. In drying mechanism, the combination of an annular drying table; a frame rotatably mounted centrally of said table and extending thereover; material feeding and removing means carried by said frame in operative relation to said table; and independent means adapted to operate said table and said feeding and removing means.

16. In drying mechanism, the combination of an annular drying table; a frame rotatably mounted centrally of said table and extending thereover; material feeding and removing means carried by said frame in operative relation to said table; an electric motor connected to rotate said frame; and other electric motors connected to operate said feeding and removing means.

17. In drying mechanism, the combination of an annular drying table; a frame rotatably mounted centrally of said table and extending thereover; material feeding and removing means carried by said frame in operative relation to said table; an electric motor connected to rotate said frame; other electric motors connected to operate said feeding and removing means; and means for controlling the operation of said motors.

18. In drying mechanism, the combination of an annular drying table; a frame rotatably mounted centrally of said table and extending thereover; material feeding and removing means carried by said frame in operative relation to said table; an electric motor connected to rotate said frame; other electric motors connected to operate said feeding and removing means; and separate means for independently controlling the operation of said motors.

Signed by me this 7th day of April, 1912.

WM. R. MACKLIND.

Attested by—
  Horace B. Fay,
  Anna L. Gill.